(12) United States Patent
Anstis et al.

(10) Patent No.: US 10,061,758 B2
(45) Date of Patent: Aug. 28, 2018

(54) TABULAR WIDGET WITH MERGABLE CELLS

(75) Inventors: Michael Anstis, Essex (GB); Mark Proctor, London (GB)

(73) Assignee: Red Hat, Inc., Raleigh, NC (US)

( * ) Notice: Subject to any disclaimer, the term of this patent is extended or adjusted under 35 U.S.C. 154(b) by 1016 days.

(21) Appl. No.: 13/434,724

(22) Filed: Mar. 29, 2012

(65) Prior Publication Data

US 2013/0262974 A1 Oct. 3, 2013

(51) Int. Cl.
*G06F 17/00* (2006.01)
*G06F 17/24* (2006.01)

(52) U.S. Cl.
CPC .................. *G06F 17/246* (2013.01)

(58) Field of Classification Search
CPC .. G06F 17/246; G06F 17/2247; G06F 3/0481; G06F 17/212
USPC ......................................... 715/218, 212, 217
See application file for complete search history.

(56) References Cited

U.S. PATENT DOCUMENTS

| | | | | |
|---|---|---|---|---|
| 5,418,898 A * | 5/1995 | Zand et al. | | 715/255 |
| 5,864,863 A * | 1/1999 | Burrows | | G06F 17/30622 |
| 5,881,381 A * | 3/1999 | Yamashita | | G06F 17/246 |
| | | | | 715/209 |
| 6,408,292 B1 * | 6/2002 | Bakalash | | G06F 17/30489 |
| 6,442,575 B2 * | 8/2002 | Pratley | | G06F 17/245 |
| | | | | 715/212 |
| 6,460,043 B1 * | 10/2002 | Tabbara | | G06F 17/30392 |
| 6,565,609 B1 * | 5/2003 | Sorge | | G06F 17/30569 |
| | | | | 707/E17.006 |
| 7,233,951 B1 * | 6/2007 | Gainer et al. | | |
| 8,954,838 B2 * | 2/2015 | Balaram | | G06F 17/246 |
| | | | | 715/217 |
| 2002/0078086 A1 * | 6/2002 | Alden | | G06F 17/246 |
| | | | | 715/213 |
| 2002/0116417 A1 * | 8/2002 | Weinberg et al. | | 707/517 |
| 2003/0226105 A1 * | 12/2003 | Waldau | | G06F 17/30905 |
| | | | | 715/212 |
| 2004/0172592 A1 * | 9/2004 | Collie et al. | | 715/503 |
| 2004/0210822 A1 * | 10/2004 | Kotler et al. | | 715/500 |
| 2005/0015732 A1 * | 1/2005 | Vedula | | G06F 8/34 |
| | | | | 715/805 |
| 2005/0210372 A1 * | 9/2005 | Kraft | | G06F 17/212 |
| | | | | 715/205 |
| 2006/0095833 A1 * | 5/2006 | Orchard et al. | | 715/503 |
| 2007/0162840 A1 * | 7/2007 | Rochelle | | G06F 17/2247 |
| | | | | 715/210 |
| 2010/0205520 A1 * | 8/2010 | Parish et al. | | 715/212 |
| 2011/0138265 A1 * | 6/2011 | Balaram et al. | | 715/217 |
| 2011/0307772 A1 * | 12/2011 | Lloyd et al. | | 715/212 |

* cited by examiner

*Primary Examiner* — Laurie A Ries
*Assistant Examiner* — Brian Garmon
(74) *Attorney, Agent, or Firm* — Lowenstein Sandler LLP (57) ABSTRACT

Disclosed herein are systems, methods, and non-transitory computer-readable storage media for managing spreadsheets with decision tables. The exemplary method includes generating an underlying data model associated with a visual data model of a spreadsheet containing a decision table, populating the underlying data model based on information contained in the visual data model and based on the decision table, generating a first index for mapping cells in the visual data model to cells in the underlying data model consistent with the decision table, and generating a second index for mapping cells in the underlying data model to cells in the visual data model consistent with the decision table.

20 Claims, 7 Drawing Sheets

TABULAR WIDGET WITH MERGABLE CELLS

TECHNICAL FIELD

Embodiments of the present invention relate to information display in cells and tables, and more specifically to handling of data associated with decision tables in a spreadsheet or similar data representation.

BACKGROUND

Spreadsheets are a common and powerful software tool. Business analysts and others use spreadsheets for purposes beyond the original design and intent of spreadsheets. Spreadsheets provide a familiar environment in which forms of tabular data are created and maintained with the user taking advantage of authoring tools to structure data. Decision Tables are a tabular form of expressing logic. One axis defines predicates and consequences and the other axis defines sets of predicates and consequences; each set of which is considered a discrete logical decision. Cells within the table define values for the predicates and consequences. Users can merge cells for organizational or other purposes to provide or indicate particular meaning to the operation of the decision table.

Decision Tables are frequently defined in spreadsheets and hence may fall into the category of spreadsheet misuse as a way to inject functionality into a spreadsheet for which the spreadsheet was not originally intended. When creating a decision table, a user typically explicitly defines appropriate columns and rows and manages merging of cells to achieve a required result with no assistance from the tool. When a user wishes to update, sort, or modify a decision table created in this way, the process is often laborious, error-prone, and time consuming, because the user should manually unmerge, fill in, sort, and/or update cells, as set forth below.

An illustrative example decision table is shown in Table 1, below.

TABLE 1

| Policy type | Applicant age | Premium |
|---|---|---|
| Comprehensive | <18 | 1000 |
| | 10 <= age < 25 | 750 |
| | 25 <= age < 40 | 500 |
| Third Party, Fire & Theft | <18 | 750 |
| | 18 <= age < 25 | 500 |
| | 25 <= age < 40 | 250 |
| Third Party | <18 | 500 |
| | 18 <= age < 25 | 250 |
| | 25 <= age < 40 | 50 |

Tables 2-5, below, illustrate operations on the example decision table. This decision table is illustrated as an arrangement of merged and non-merged cells in a spreadsheet which represent a model of logic. In this example the logic represented is a simplified insurance premium calculator, but other more complex logic can also be represented in a similar manner. More complex decision tables can span one or more pages in a spreadsheet. The various policy types in the first column of this example decision table are "Comprehensive", "Third Party, Fire & Theft", and "Third Party". Each of the policy type cells is merged to cover three different cells in the second column representing different applicant ages, "<18", "18<=age <25", and "25<=age 40". The third column of cells shows premiums corresponding to each applicant age for each policy type. If a user wants to update all premiums for applicants younger than 18 irrespective of policy type, the user should manually locate each row where the age is less than 18 and update the premium value. The user can alternately use sort and merge functions in a spreadsheet program to simplify the process, but many components of the process are still laborious. The user should remove the merging from the cells, complete blank cells, sort the cells, and update the desired cells, as shown in Tables 2-5.

TABLE 2

| Policy type | Applicant age | Premium |
|---|---|---|
| Comprehensive | <18 | 1000 |
| | 10 <= age < 25 | 750 |
| | 25 <= age < 40 | 500 |
| Third Party, Fire & Theft | <10 | 750 |
| | 18 <= age < 25 | 500 |
| | 25 <= age < 40 | 250 |
| Third Party | <18 | 500 |
| | 18 <= age < 25 | 250 |
| | 25 <= age < 40 | 50 |

Table 2 illustrates removing merging from the first example decision table. The cells in the first column which were merged in Table 1 are unmerged, separating them into individual cells. However, the unmerged cells which are not the first cell are blank. For example, when a cell that has been created by merging 3 cells is subsequently unmerged, the first cell retains the value, and the remaining cells are blank, or do not contain any value. In order to correct this problem, the user should populate those blank cells with the proper values reflecting their previously merged state in order to maintain order and data consistency in the spreadsheet.

TABLE 3

| Policy type | Applicant age | Premium |
|---|---|---|
| Comprehensive | <18 | 1000 |
| Comprehensive | 18 <= age < 25 | 750 |
| Comprehensive | 25 <= age < 40 | 500 |
| Third Party, Fire & Theft | <18 | 750 |
| Third Party, Fire & Theft | 18 <= age < 25 | 500 |
| Third Party, Fire & Theft | 25 <= age < 40 | 250 |
| Third Party | <18 | 500 |
| Third Party | 18 <= age < 25 | 250 |
| Third Party | 25 <= age < 40 | 50 |

Table 3 illustrates completing the resulting blank cells in the example decision table as shown in Table 2. In this case, the user manually enters the text in each blank cell that corresponds to its previously merged state.

TABLE 4

| Policy type | Applicant age | Premium |
|---|---|---|
| Comprehensive | <18 | 1000 |
| Third Party, Fire & Theft | <18 | 750 |
| Third Party | <18 | 500 |
| Comprehensive | 18 <= age < 25 | 750 |
| Third Party, Fire & Theft | 18 <= age < 25 | 500 |
| Third Party | 18 <= age < 25 | 250 |
| Comprehensive | 25 <= age < 40 | 500 |
| Third Party, Fire & Theft | 25 <= age < 40 | 250 |
| Third Party | 25 <= age < 40 | 50 |

Table 4 illustrates sorting cells in the decision table as shown in Table 3. In this case, the user wants to view all the premiums for the age bracket <18. The user sorts the cells by the applicant age column so that all the cells corresponding to the applicant age are in at the top of the column.

TABLE 5

| Policy type | Applicant age | Premium |
|---|---|---|
| Comprehensive | <18 | 1500 |
| Third Party, Fire & Theft | <18 | 1500 |
| Third Party | <18 | 1500 |
| Comprehensive | 18 <= age < 25 | 750 |
| Third Party, Fire & Theft | 18 <= age < 25 | 500 |
| Third Party | 18 <= age < 25 | 250 |
| Comprehensive | 25 <= age < 40 | 500 |
| Third Party, Fire & Theft | 25 <= age < 40 | 250 |
| Third Party | 25 <= age < 40 | 50 |

Table 5 illustrates updating cells in the decision table as shown in Table 4. In this case, the user enters 1500 for each cell where the applicant age is <18. Then, the user should undo all or part of those steps to restore the functionality of the decision table in the spreadsheet. This process is laborious, error prone, and time consuming.

BRIEF DESCRIPTION OF THE DRAWINGS

The present invention is illustrated by way of example, and not by way of limitation, in the figures of the accompanying drawings and in which.

DETAILED DESCRIPTION

Described herein are a method, apparatus, and non-transitory computer-readable storage medium storing instructions for creating, displaying, managing, and otherwise manipulating spreadsheets with merged cells, such as a decision table. In one embodiment, the data and the graphical, e.g., HTML, representation of the data are separated when displayed as part of a grid widget. The grid widget can incorporate implicit cell merging which can be toggled on or off. Implicit cell merging can always merge all adjacent cells of a same value or of a same value range. Merged cells can be collapsed, or subsequently expanded, grouping rows intersecting the collapsed cell together. When merged cells are collapsed and rows grouped, columns with different values in the grouped rows can be highlighted so the user is aware that if they change the cell's value they are changing the value of multiple underlying cells. The spreadsheet enables flexible "group by" behavior by sorting and using the implicit merge feature.

The term "grid widget" is used herein to disambiguate the grid widget from other graphical user-interface components. Table 6, below, illustrates an enhanced decision table spreadsheet with merging enabled.

TABLE 6

| | # | Description | Policy type | Maximum age ▼ | Minimum age | |
|---|---|---|---|---|---|---|
| | | | Policy [$p] | Applicant [$a] | | |
| | | type [==] | | age [<] | age [>=] | Set premium |
| + | 1 | | ▬Comprehensive | 18 | | 1000 |
| +− | 2 | | | 25 | 18 | 750 |
| +− | 3 | | | 40 | 25 | 500 |
| +− | 4 | | ▬Third Party Fire & | 18 | | 750 |
| +− | 5 | | Theft | 25 | 18 | 500 |
| +− | 6 | | | 40 | 25 | 250 |
| +− | 7 | | ▬Third Party | 18 | | 500 |
| +− | 8 | | | 25 | 18 | 250 |
| +− | 9 | | | 40 | 25 | 50 |

The grid widget may serve as an interface to allow simple and easy manipulation of the underlying data which is separately stored and maintained from the graphical representation of the values in the spreadsheet. The separation of the underlying data from the graphical representation allows users to save significant time in managing, editing, and otherwise using decision tables represented in spreadsheets.

Embodiments of the invention allow for improved authoring of decision tables. The underlying data model can be separated from the visualized model as displayed in the spreadsheet. Cell merging can be implicit and can be toggled on or off, and implicit cell merging can merge all adjacent cells of the same value. Via the grid widget, a user can collapse merged cells or subsequently expand collapsed merged cells, group rows intersecting the collapsed cell together, and so forth. Further, when merged cells are collapsed and rows grouped, columns with different values in the grouped rows can be highlighted so the user is aware that if they change the cell's value they are changing the value of multiple underlying cells. As a result, flexible "group by" behavior is enabled by sorting and using implicit merging.

Table 6 is an example of an enhancement to Table 1, with merging enabled, illustrating some embodiments of the present invention. In particular, the user can enable merging, sort, group, and update cell values, as shown in Tables 7-9.

TABLE 7

| | # | Description | Policy type [==] | Policy [$p] | age [<] Applicant [$a] ▲ | age [>=] | Set premium |
|---|---|---|---|---|---|---|---|
| +− | 1 | | Comprehensive | | −18 | | 1000 |
| +− | 2 | | Third Party Fire & Theft | | | | 750 |
| +− | 3 | | Third Party | | | | 500 |
| +− | 4 | | Comprehensive | | −25 | −18 | 750 |
| +− | 5 | | Third Party Fire & Theft | | | | 500 |
| +− | 6 | | Third Party | | | | 250 |
| +− | 7 | | Comprehensive | | −40 | −25 | 500 |
| +− | 8 | | Third Party Fire & Theft | | | | 250 |
| +− | 9 | | Third Party | | | | 50 |

Note: Maximum age column sorted ▼; age [<] sorted ▲.

Table 7 illustrates sorting cells of Table 6 by maximum age in accordance with some embodiments. The maximum age cells can be automatically merged together via a collapsible widget to keep the group of cells sharing a common value together. In one embodiment, a grid system is provided that can determine, based on the contents of the cells, the type of user query or action, and/or other data sources, which cells to merge and how to merge them for the appropriate context. For example, if the user was sorting by premium amount, the grid system could merge the three cells having a value of 500, merge the two cells having a value of 750, merge the two cells having a value of 250, and leave the remaining cells having values of 1000 and 50 unmerged because no other cells share a common value. In some cases, the grid system can merge cells that fall within a threshold range of values. For example, the grid system can merge cells having values within 5% of each other, or within some other threshold distance. The grid system can determine these merging preferences automatically based on the data displayed and/or a type of data displayed, or a user can provide specific preferences.

Table 8 illustrates grouping cells in the second example decision table shown in Table 7. The user clicks the icon to collapse or group the cells where the maximum age is 18. The grid system updates the display, temporarily groups those cells, and can provide a graphical or other indication that the cells are collapsed. For example, the display can provide graphical indications, including the change in color and the change in the icon from a minus sign to a plus sign. Other example indications can include changes in shading, size, border, font, positioning, clarity, motion, shadows, and other graphical enhancements. The grid system can provide non-graphical feedback of these grouped cells, such as a providing vibration on a mobile device when a cursor moves over grouped cells, or producing a sound when the user moves the focus on a set of grouped cells such as clicking on them.

TABLE 8

| | # | Description | Policy type [==] | Policy [$p] | age [<] Applicant [$a] ▲ | age [>=] | Set premium |
|---|---|---|---|---|---|---|---|
| +− | 1 | | Comprehensive | | +18 | | 1000 |
| +− | 4 | | Comprehensive | | −25 | −18 | 750 |
| +− | 5 | | Third Party Fire & Theft | | | | 500 |
| +− | 6 | | Third Party | | | | 250 |
| +− | 7 | | Comprehensive | | −40 | −25 | 500 |
| +− | 8 | | Third Party Fire & Theft | | | | 250 |
| +− | 9 | | Third Party | | | | 50 |

TABLE 9

| | # | Description | Policy [$p] type [==] | Policy type Maximum age ▼ age [<] ▲ | Applicant [$a] age [>=] | Minimum age Set premium |
|---|---|---|---|---|---|---|
| +- | 1 | | Comprehensive | +18 | | 1000 |
| +- | 4 | | Comprehensive | -25 | -18 | 750 |
| +- | 5 | | Third Party Fire & Theft | | | 500 |
| +- | 6 | | Third Party | | | 250 |
| +- | 7 | | Comprehensive | -40 | -25 | 500 |
| +- | 8 | | Third Party Fire & Theft | | | 250 |
| +- | 9 | | Third Party | | | 50 |

Table 9 illustrates updating cells in the second example decision table. Once the correct set of cells is grouped, the user can edit a single box, in this case changing the 1000 premium to 1500, to make the change effective for the entire set of cells. The user can then manually revert to a desired state or arrangement of cells. In one variation, the grid system can provide a widget to 'bounce back' to a desired cell layout or saved configuration. For example, via such a widget, the user could easily go from the cell arrangement shown in Table 9 back to the cell arrangement shown in Table 5, but now with the updated premiums. Alternatively, the user can undo cell sorting or grouping actions independently of changes to the values, so that the user can step backwards to a desired cell configuration while keeping changes to the cell values.

Figure 1:
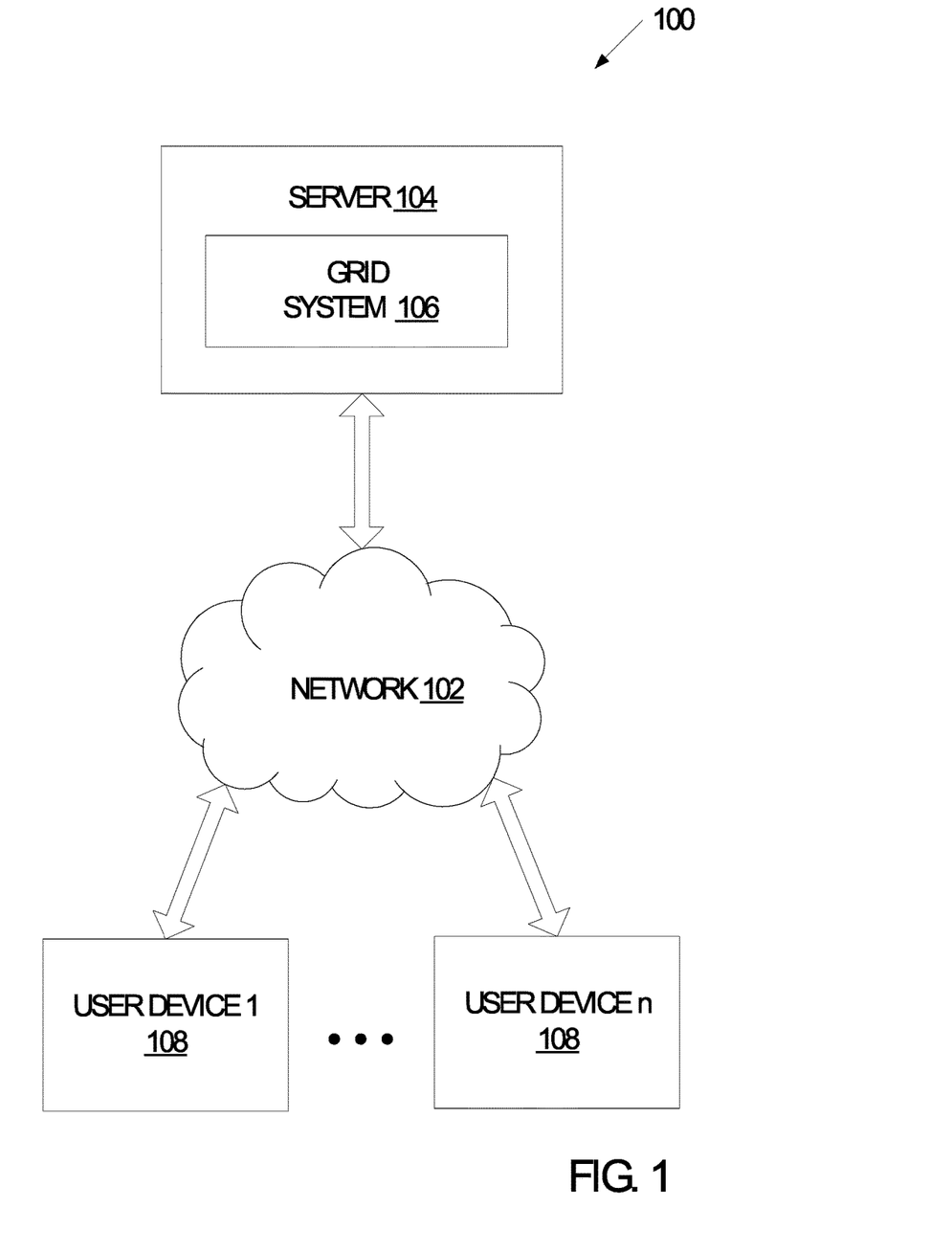
FIG. 1 illustrates an exemplary network architecture.

In one embodiment, the grid system builds a web-based spreadsheet providing the functionality described herein. The web-based spreadsheet may be part of a web application or an independent application. In one implementation, the grid system uses the Google Web Toolkit (GWT) to provide common cross-browser compatibility for a web-based spreadsheet. The principles set forth herein can be applied equally to any implementation based upon HTML tables, as well as local or cloud-hosted spreadsheet applications which are not HTML based or implementations based on other rendering technologies. FIG. 1 illustrates an exemplary network architecture 100, in accordance with some embodiments. The network architecture 100 may include a server 104 and multiple user devices 108 coupled to the server 104 via a network 102 (e.g., public network such as the Internet, or private network such as a local area network (LAN), or another network, e.g., a mobile communications network).

The user devices 108 may include any type of computing devices such as portable digital assistants, mobile phones, laptop computers, portable media players, tablet computers, netbooks, notebooks, desktop computers, gaming consoles, DVD players, media centers, and the like. The server 104 may include one or more machines such as one or more server computer systems, routers, gateways, etc.

The server 104 hosts a grid system 106 that provides a web-based spreadsheet to users of user devices 108, and allows the users to makes changes to cells in the spreadsheet. When multiple users are modifying such a spreadsheet in a shared authoring environment, the system can 'lock' certain cells, entries, and/or the entire dataset to avoid data corruption while performing an operation so that others cannot modify the locked portions during the operation. The functionality of the grid system 106 will be discussed in more detail below.

Although the network architecture 100 is illustrated as a client-server environment, the functionality discussed herein may be implemented in a peer-to-peer environment (e.g., the video conference system 106 residing on one or more nodes), a cloud computing environment (e.g., the video conference system 106 residing within a computing cloud), a grid computing environment (e.g., the video conference system 106 residing within a distributed computing system), etc.

Figure 2:
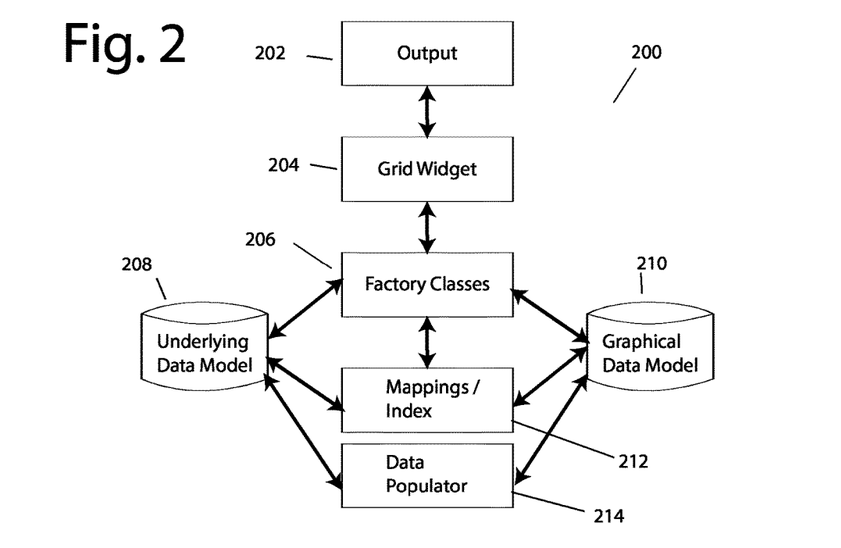
FIG. 2 illustrates an example data storage architecture.

FIG. 2 illustrates a grid system 200 according to some embodiments of the invention. The grid system 200 can include a data populator 214 that populates grid widget 204 with data, such as loading data from an existing spreadsheet. In one embodiment, the data populator 214 pushes data into the grid widget 204 directly, via a series of Factory classes 206 that convert the underlying domain model into an independent structure used by the grid widget 204, or the data populator 214 can directly manipulate one or both of the underlying data model or the graphical data model. The Factory classes 206 can also define the type of widget that should be used to represent the data model element in the grid widget.

The grid system 200 may include an underlying data model 208 and a graphical data model 210. The underlying data model 208 represents the data in the spreadsheet in a structure that represents the decision table but that is different from how the decision table is displayed to the user. The graphical data model 210, on the other hand, represents the data in the spreadsheet as it is displayed to the user. The particular arrangement of these data models is based on the type and structure of the decision table. These data models can be generated manually or automatically as a user creates the elements that make up a decision table, or modifies an existing decision table.

This grid widget can display the domain model element in the grid and provide a mechanism for editing or otherwise manipulating the domain model element. The user views the spreadsheet via the display output 202 produced by the grid widget 204. When the user makes changes to cells in the spreadsheet, the grid widget 204 accesses the underlying data model 208 and the graphical data model 210 via one or more factory classes 206 which use a mapping 212 to translate addresses from one model to the other. The factory classes 206 or some other element can then directly modify data in the underlying data model 208, for example, make the corresponding changes in the graphical data model 210, and update the display 202 accordingly.

The grid system manipulates the domain model elements via an index or mapping 212 that coordinates between the underlying domain model and arrangement displayed to the user. The grid widget (or other module not shown herein) maintains index or mapping 212 that provides a bi-directional correlation between the logical coordinates in the data layer and the 'physical' coordinates in the rendering layer. The physical coordinates may not actually be physical coordinates, but represent physical coordinates on a display, and may alternately be referred to as graphical coordinates. The index may be referenced by coordinate (either logical or physical) and also contain details of the number of rows merged to guide the rendering process.

The logical-to-physical mapping allows cells in the rendering layer to be programmatically controlled. If the data at a specific logical coordinate should be updated with a new value, the system can determine the physical coordinate in the rendering layer. Conversely, if a cell in the rendering layer is edited, the system can retrieve the logical coordinate in the data layer. The grid system 200 can update the index when an operation is performed on the grid widget that affects its internal structure, such as adding or deleting rows or columns, toggling cells between a "merged" and an "unmerged" state, or "grouping" cells.

Two example indexes are discussed herein. The first example index is a basic index as shown in FIG. 3, and the second example index is a merged cell index as shown in FIG. 4.

Figure 3:
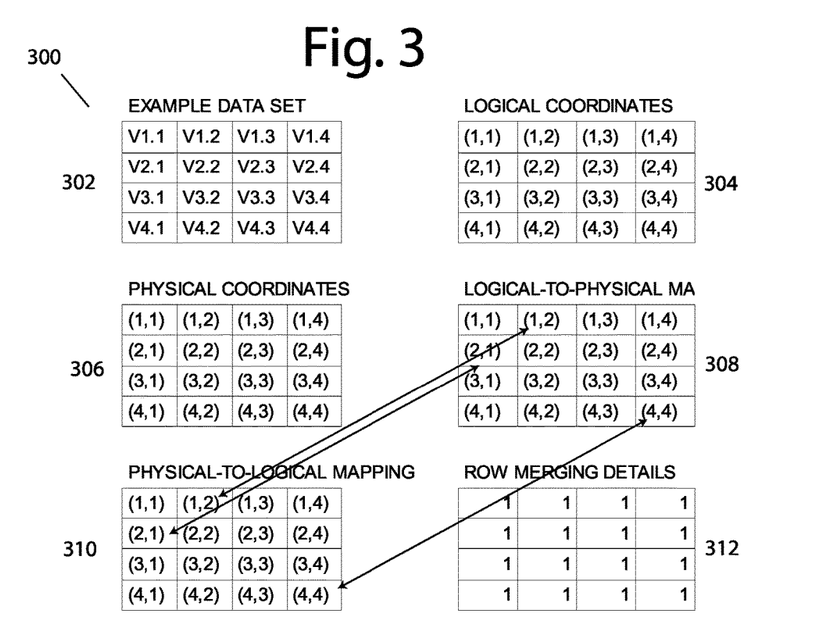
FIG. 3 illustrates an example basic index.

FIG. 3 illustrates an example basic index 300. When data in the grid widget is not merged the correlation between logical data-coordinates and physical coordinates in the rendering layer is simply a one-to-one mapping. Thus, for the example data set 302, the logical coordinates 304 and the physical coordinates 306 are exactly the same, and the logical-to-physical coordinate mapping 308 maps directly to the physical-to-logical coordinate mapping 310. The row merging details table 312 is populated by 1s because no rows are merged.

Figure 4:
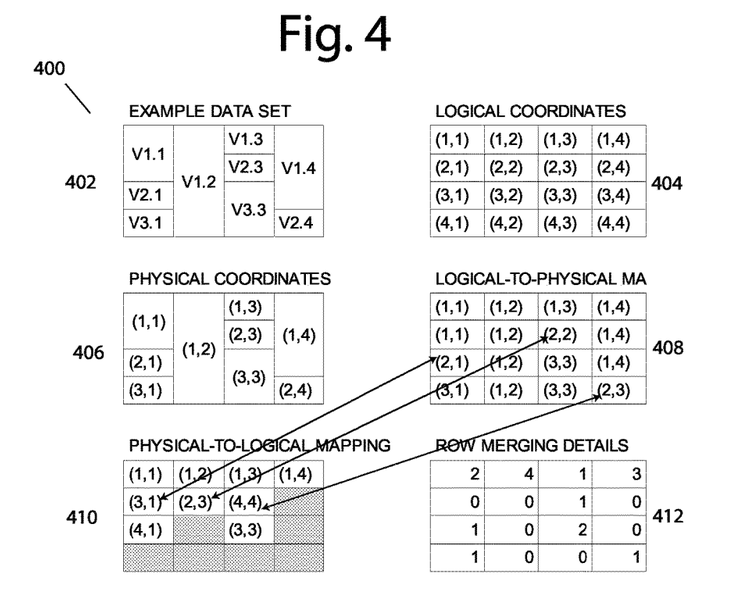
FIG. 4 illustrates an example merged cell index.

FIG. 4 illustrates an example merged cell index 400. When values across multiple consecutive rows in a single column are identical the system and/or the user can merge cells. The underlying data remains unchanged; however the mapping between logical and physical coordinates reflects the different coordinate system, such as tables in an HTML page, when cells are merged. The example data set 402 has several merged sets of cells, such as V1.1, V1.2, V3.3, and V1.4. The logical coordinates 404 retain the original number of cells, and does not change. The physical coordinates 406 are updated to match the example data set 402. In this example, the logical-to-physical coordinate mapping 408 maps to the physical-to-logical coordinate mapping 410 so as to reflect the merged cells. For example, cell (2,1) in the logical-to-physical coordinate mapping 408 maps to (3,1) in the physical-to-logical coordinate mapping 410, cell (2,2) in the logical-to-physical coordinate mapping 408 maps to (2,3) in the physical-to-logical coordinate mapping 410, and cell (2,3) in the logical-to-physical coordinate mapping 408 maps to (4,4) in the physical-to-logical coordinate mapping 410. Due to the merged cells, certain portions of the physical-to-logical coordinate mapping are unreachable because no meaningful data is available at those locations. The unreachable portions can simply be unreferenced by other cells, can be explicitly marked as unreachable, or can be populated will zeros or null values, for example. Similarly, the row merging details table 412 is populated by values that reflect how many cells are merged for each location, with 0s indicating a cell that is merged into another cell. Thus, the location corresponding to V1.1 n the example data set contains a 2 because 2 cells are merged at that location, the location corresponding to V1.2 in the example data set contains a 4, the location corresponding to V3.3 in the example data set contains a 2, and the location corresponding to V1.4 in the example data set contains a 3.

TABLE 12

|   | 0 | 1 | 2 | 3 |
|---|---|---|---|---|
| 0 | Value<br>mapHtmlToData<br>MapDataToHtml | Value<br>mapHtmlToData<br>MapDataToHtml | Value<br>mapHtmlToData<br>mapDataToHtml | Value<br>mapHtmlToData<br>mapDataToHtml |
| 1 | Value<br>mapHtmlToData<br>mapDataToHtml | Value<br>mapHtmlToData<br>mapDataToHtml | Value<br>mapHtmlToData<br>mapDataToHtml | Value<br>mapHtmlToData<br>mapDataToHtml |
| 2 | Value<br>mapHtmlToData<br>mapDataToHtml | Value<br>mapHtmlToData<br>mapDataToHtml | Value<br>mapHtmlToData<br>mapDataToHtml | Value<br>mapHtmlToData<br>mapDataToHtml |
| 3 | Value<br>mapHtmlToData<br>mapDataToHtml | Value<br>mapHtmlToData<br>mapDataToHtml | Value<br>mapHtmlToData<br>mapDataToHtml | Value<br>mapHtmlToData<br>mapDataToHtml |

Table 12 illustrates an example index structure. The example index structure has two dimensions, the magnitude of each being identical to the equivalent dimension of the underlying data. The dimensionality of the index structure can match all or part of the dimensionality of the underlying data. The system can access the index using either the logical or physical coordinate. Then the system retrieves data from the applicable mapped coordinate. Each location in the index can contain the following example data-structure:

| private T | value; |
|---|---|
| private Coordinate | mapHtmlToData; |
| private Coordinate | mapDataToHtml; |

Figure 5:
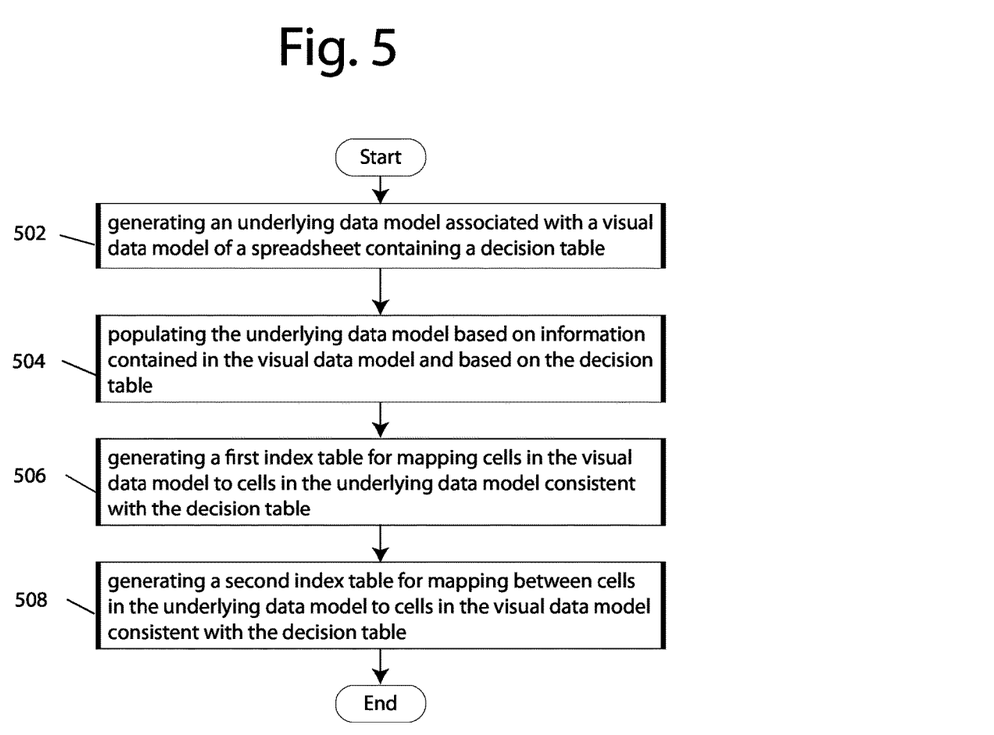
FIG. 5 illustrates a first example method embodiment.
Figure 6:
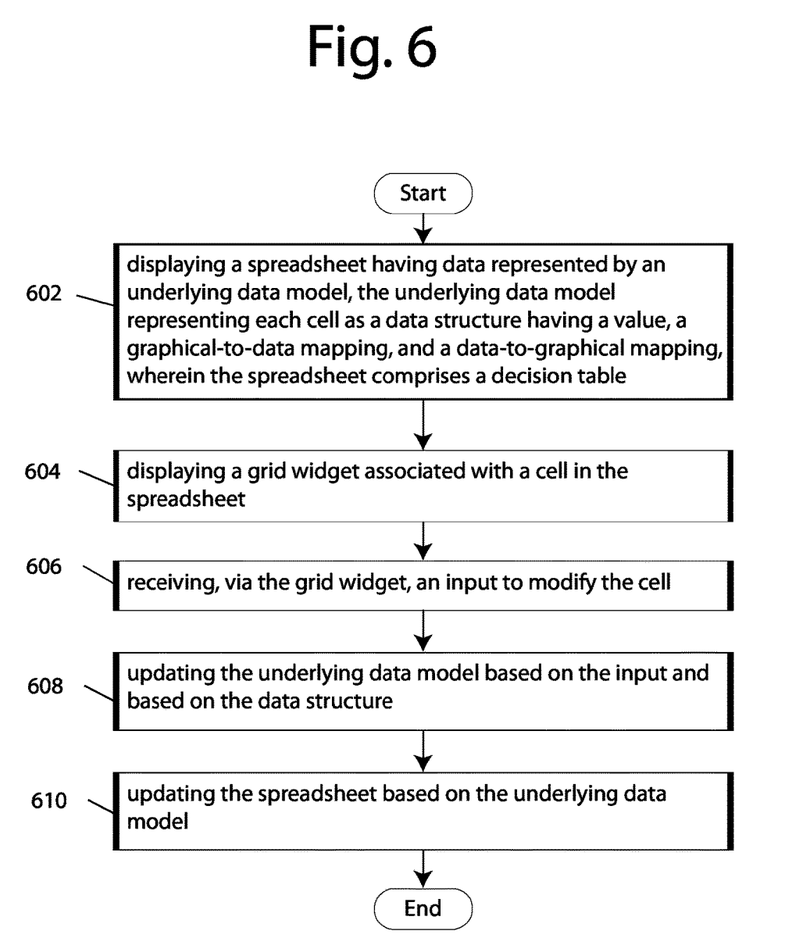
FIG. 6 illustrates a second example method embodiment.
Figure 7:
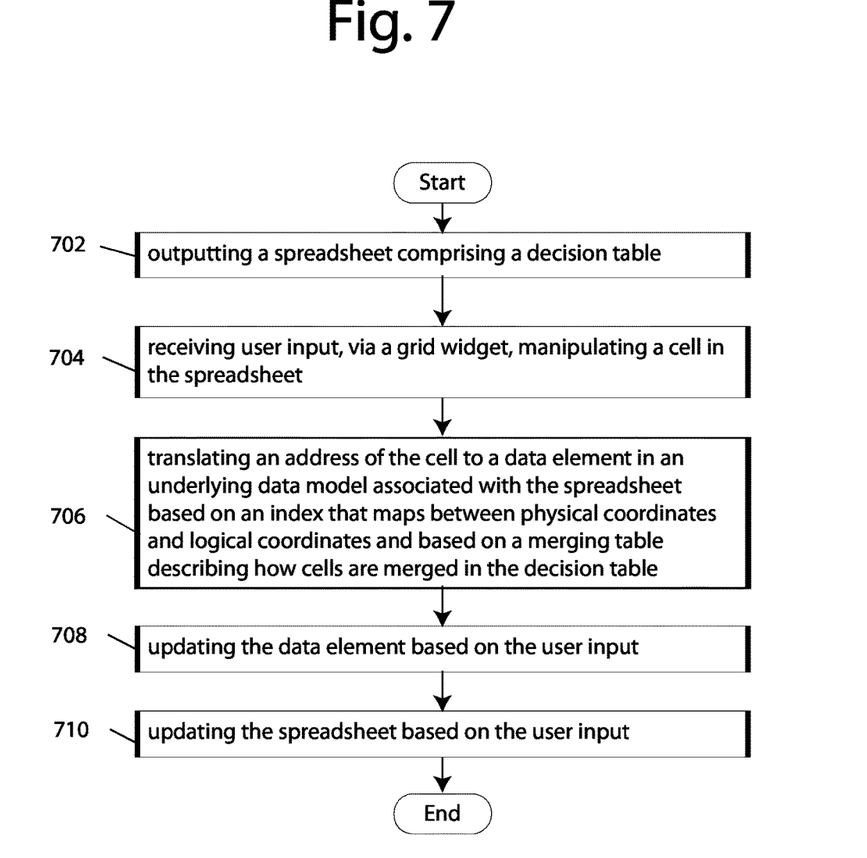
FIG. 7 illustrates a third example method embodiment.

T is the value of the cell, mapHtmlToData is a coordinate in the logical coordinate system, and mapDataToHtml is a coordinate in the physical coordinate system. Index locations can also store additional information, such as an individual history of the value as well as a coordinate history to enable targeted and specific undo behavior. Index locations can additionally store security and/or access information, metadata, display preferences, and so forth. FIGS. 5, 6, and 7 are flow diagrams of various embodiments of methods for handling data associated with decision tables in a spreadsheet or similar data representation. The methods are performed by processing logic that may comprise hardware (circuitry, dedicated logic, etc.), software (such as is run on a general purpose computer system or a dedicated machine), or a combination of both. In one embodiment, the methods of FIGS. 5, 6 and 7 are performed by a grid system 106 of FIG. 1.

FIG. 5 illustrates a flow diagram of one embodiment of a method for generating and populating a grid widget for representing a spreadsheet having a decision table. The grid system generates an underlying data model associated with a visual data model of a spreadsheet containing a decision table (502). The grid system populates the underlying data model based on information contained in the visual data model and based on the decision table (504).

The grid system generates a first index for mapping cells in the visual data model to cells in the underlying data model consistent with the decision table (506). The grid system generates a second index for mapping cells in the underlying data model to cells in the visual data model consistent with the decision table (508). The first index and the second index can represent a bidirectional correlation between logical coordinates in the underlying data model and graphical coordinates in the visual data model. The first index and the second index can be maintained separately or as part of a single file. The index tables can also be stored on separate physical machines or storage devices, for example. Cell merging in the spreadsheet can be implicit, and can be toggled between an enabled state and a disabled state.

The grid system can display the spreadsheet via the grid widget associated with the first index and the second index. Then, when the user modifies a cell structure of the decision table, via the grid widget, the grid system can modify the decision table, via a factory class and based on the request, by altering the first index and the second index and by updating the visual data model of the spreadsheet.

The grid system can further receive a user input to modify a cell via the visual data model of the spreadsheet, and based on at least one of the first index and the second index, modifying a representation of the cell in the underlying data model and in the visual data model according to the user input. Further, the grid system can receive a user input to modify a cell via the underlying data model of the spreadsheet, and based on at least one of the first index and the second index, modify a representation of the cell in the underlying data model and in the visual data model according to the user input.

FIG. 6 illustrates a flow diagram of one embodiment of a method for updating a grid widget based on user input. In this embodiment, the grid system displays a spreadsheet having data represented by an underlying data model, the underlying data model representing each cell as a data structure having a value, a graphical-to-data mapping, and a data-to-graphical mapping, wherein the spreadsheet comprises a decision table (602).

The grid system displays a grid widget associated with a cell and/or group of cells in the spreadsheet (604) or alternatively associated with an entire spreadsheet. The grid system receives, via the grid widget, an input to modify the cell (606). Then the grid system updates the underlying data model based on the input and based on the data structure (608). The grid system can include a data consistency enforcement mechanism to ensure that data displayed is consistent with the data underlying data model. Alternatively, the grid system can assign a priority to the underlying data model, for example, so that in the event of a conflict between the two sources of data, the underlying data model controls. The grid system updates the spreadsheet based on the underlying data model (610).

FIG. 7 illustrates a flow diagram of one embodiment of a method for updating a grid widget based spreadsheet by translating coordinates between physical and logical coordinates. The grid system outputs, via a display, a spreadsheet comprising a decision table (702). The grid system receives user input, via a grid widget, manipulating a cell in the spreadsheet (704). The grid system translates an address of the cell to a data element in an underlying data model associated with the spreadsheet based on an index that maps between physical coordinates and logical coordinates and based on a merging table describing how cells are merged in the decision table (706). Then the grid system updates the data element based on the user input (708) and updates the spreadsheet based on the user input (710). The index can include a cell value, a physical-to-logical coordinate mapping, and a logical-to-physical coordinate mapping. The user input can specify a modification to a merged cell, so that the system updates the merging table based on the modification.

Figure 8:
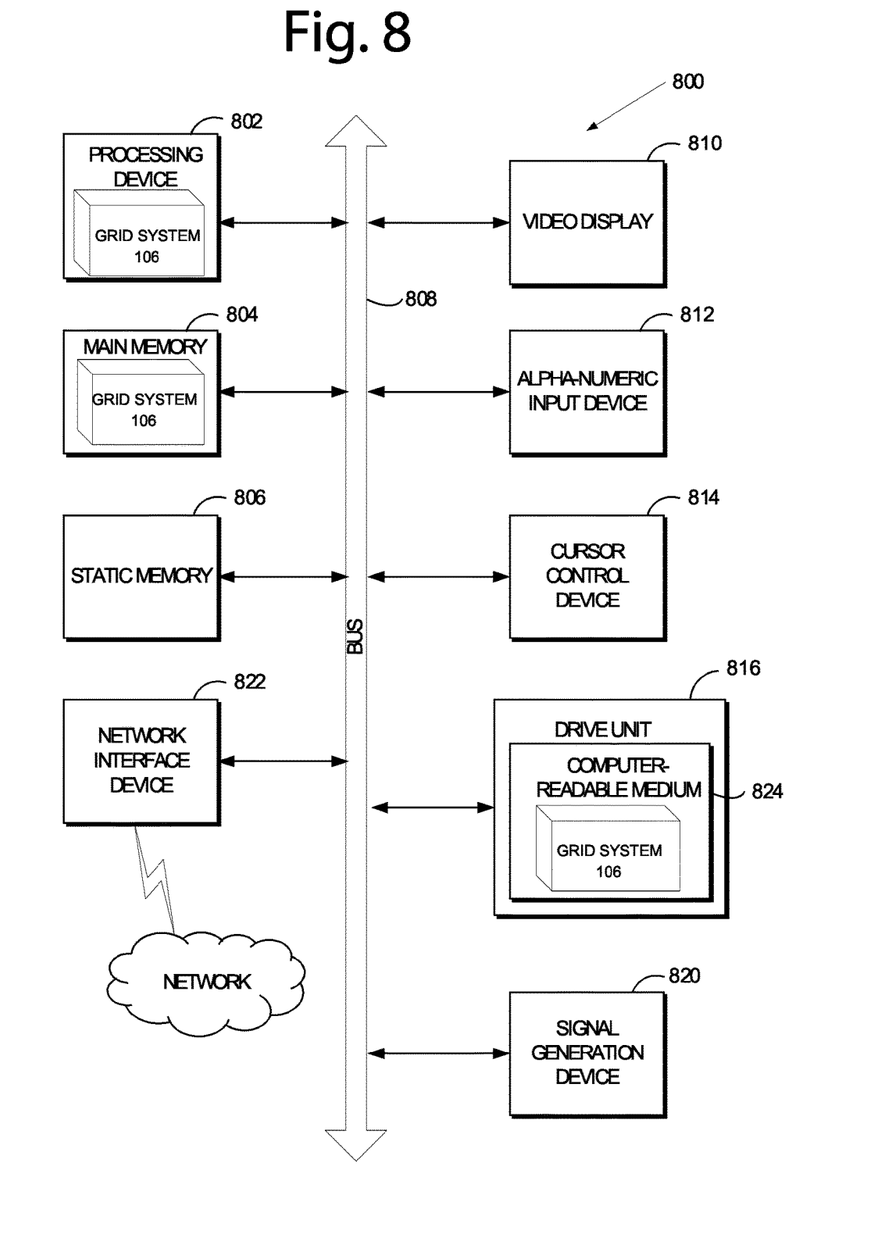
FIG. 8 illustrates a block diagram of an exemplary computer system, in accordance with one embodiment of the present invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute processing logic (e.g., instructions for executing all or part of the grid system 106) for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker) or other output device(s).

The secondary memory 818 may include a machine-readable storage medium (or more specifically a computer-readable storage medium) 824 on which is stored one or more sets of instructions for a grid system 106 embodying any one or more of the methodologies or functions described herein. The instructions for the grid system 106 may also reside, completely or at least partially, within the main memory 804 and/or within the processing device 802 during execution thereof by the computer system 800, the main memory 804 and the processing device 802 also constituting machine-readable storage media.

The computer-readable storage medium 824 can be non-transitory. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

In this disclosure, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "determining", "selecting", "migrating", "deploying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A method comprising:
   generating an underlying data model associated with a visual data model of a spreadsheet containing a decision table, wherein the visual data model comprises a graphical coordinate system corresponding to display of the spreadsheet comprising the decision table;
   populating, via a processing device, the underlying data model related to information contained in the visual data model and the decision table, wherein the underlying data model comprises a logical coordinate system;
   generating a first index to map cells in the visual data model to cells in the underlying data model consistent with the decision table, wherein the first index comprises a first plurality of cells, each cell of the first plurality of cells comprising: a cell value, a coordinate in the logical coordinate system, and a coordinate in the graphical coordinate system;
   generating a second index to map cells in the underlying data model to cells in the visual data model consistent with the decision table, wherein the second index comprise a second plurality of cells, each cell of the second plurality of cells comprising: a cell value, a coordinate in the logical coordinate system, and a coordinate in the graphical coordinate system;
   generating a cell merging table associated with the first index, wherein the cell merging table is indicative of a number of cells each having a same value that are merged into a single cell in the decision table, wherein the merged single cell having the same value, and wherein a location corresponding to the merged single cell is populated by a number of merged cells value reflecting the number of cells each having the same value merged at the location.

2. The method of claim 1, further comprising:
receiving a user input to modify a cell via the visual data model of the spreadsheet; and
according to the first index or the second index modifying a representation of the cell in the underlying data model and in the visual data model according to the user input.

3. The method of claim 1, further comprising:
receiving a user input to modify a cell via the underlying data model of the spreadsheet; and
according to the first index or the second index, modifying a representation of the cell in the underlying data model and in the visual data model according to the user input.

4. The method of claim 1, further comprising displaying a grid widget with the spreadsheet, wherein the grid widget is associated with the first index and the second index.

5. The method of claim 4, further comprising:
receiving a request to modify a cell structure of the decision table, via the grid widget; and
modifying the decision table, via a factory class and the request, by altering the first index and the second index and by updating the visual data model of the spreadsheet.

6. The method of claim 1, wherein the first index and the second index represent a bidirectional correlation between logical coordinates in the underlying data model and graphical coordinates in the visual data model.

7. The method of claim 1, wherein the first index and the second index are separate.

8. The method of claim 1, wherein cell merging in the spreadsheet is implicit which merges all adjacent cells of a same value.

9. The method of claim 8, wherein the cell merging can be toggled between an enabled state and a disabled state.

10. The method of claim 8, wherein the cell merging table further indicates which cells in the spreadsheet are merged.

11. A non-transitory computer-readable storage medium comprising instructions that, when executed by a processing device, cause the processing device to:
display a spreadsheet comprising a decision table that comprises at least one merged cell, the spreadsheet having data represented by an underlying data model and a visual data model, wherein the visual data model comprises a graphical coordinate system corresponding to the display of the spreadsheet, the underlying data model comprising a first plurality of cells, each cell of the first plurality of cells comprising a cell value, a logical coordinate, and a graphical coordinate, the visual data model comprising a second plurality of cells, each cell of the second plurality of cells comprising a cell value, a logical coordinate, and a graphical coordinate, the underlying data model representing each merged cell as a data structure having a value, a graphical-to-data mapping, a data-to-graphical mapping, and cell merging indicative of a number of cells each having a same value that are merged into a single cell in the decision table, wherein a location corresponding to a cell that is merged is populated by a number of merged cells value reflecting the number of cells each having the same value merged at the location;
display a grid widget associated with a cell in the spreadsheet;
receive, via the grid widget, an input to modify the cell;
update the underlying data model in view of the input and in view of the data structure; and
update the spreadsheet in view of the underlying data model.

12. The non-transitory computer-readable storage medium of claim 11, including further instructions that, when executed by the processing device, cause the processing device to:
update the underlying data model via a set of factory classes.

13. The non-transitory computer-readable storage medium of claim 11, wherein the graphical-to-data mapping and the data-to-graphical mapping represent a bidirectional correlation between logical coordinates in the underlying data model and coordinates in the spreadsheet.

14. The non-transitory computer-readable storage medium of claim 11, wherein the cell merging in the spreadsheet is implicit, wherein all adjacent cells of a same value are merged.

15. The non-transitory computer-readable storage medium of claim 14, including further instructions that, when executed by the processing device, cause the processing device to:
display a user interface element through which a user can toggle the cell to merge between an enabled state and a disabled state.

16. The non-transitory computer-readable storage medium of claim 15, including further instructions that, when executed by the processing device, cause the processing device to:
upon the user toggling the cell merging, update a cell merging table associated with the underlying data model and the spreadsheet, wherein the cell merging table indicates the at least one cell in the spreadsheet that are merged.

17. A system comprising:
a memory to store a first index comprising a first plurality of cells, each cell of the first plurality of cells comprising: a cell value, a coordinate in a logical coordinate system, and a coordinate in a graphical coordinate system, a second index comprising a second plurality of cells, each cell of the second plurality of cells comprising: a cell value, a coordinate in the logical coordinate system, and a coordinate in the graphical coordinate system, and a merging table;
a display; and
a processing device, operatively coupled to the memory, to:
output, via the display, a spreadsheet comprising a decision table that comprises a plurality of cells each having a same value merged and collapsed into a single cell in the decision table, wherein the merged cell having the same value;
receive user input, via a grid widget, manipulating a cell in the spreadsheet;
translate an address of the cell to a data element in an underlying data model associated with the spreadsheet in view of:
the first index that maps between graphical coordinates and logical coordinates,
the merging table indicative of the at least one cell that is merged and how cells are merged in the decision table, wherein a location corresponding to a cell that is merged is populated by a value reflecting a number of cells merged at the location;

update the data element in view of the user input; and
update the spreadsheet in view of the user input.

18. The system of claim 17, wherein the index comprises a cell value, a physical-to-logical coordinate mapping, and a logical-to-physical coordinate mapping.

19. The system of claim 17, wherein the user input specifies a modification to a merged cell of the at least one merged cell, wherein the processing device is further to:
update the merging table in view of the modification.

20. The method of claim 1, further comprising:
receiving a user input to modify a cell via the visual data model of the spreadsheet; and
modifying a representation of the cell in the underlying data model and in corresponding multiple cells in the visual data model according to the user input.

* * * * *